Aug. 31, 1926.
W. F. McDERMID
1,598,210
RAILWAY VEHICLE BRAKING SYSTEM
Filed Dec. 20, 1923      8 Sheets-Sheet 1
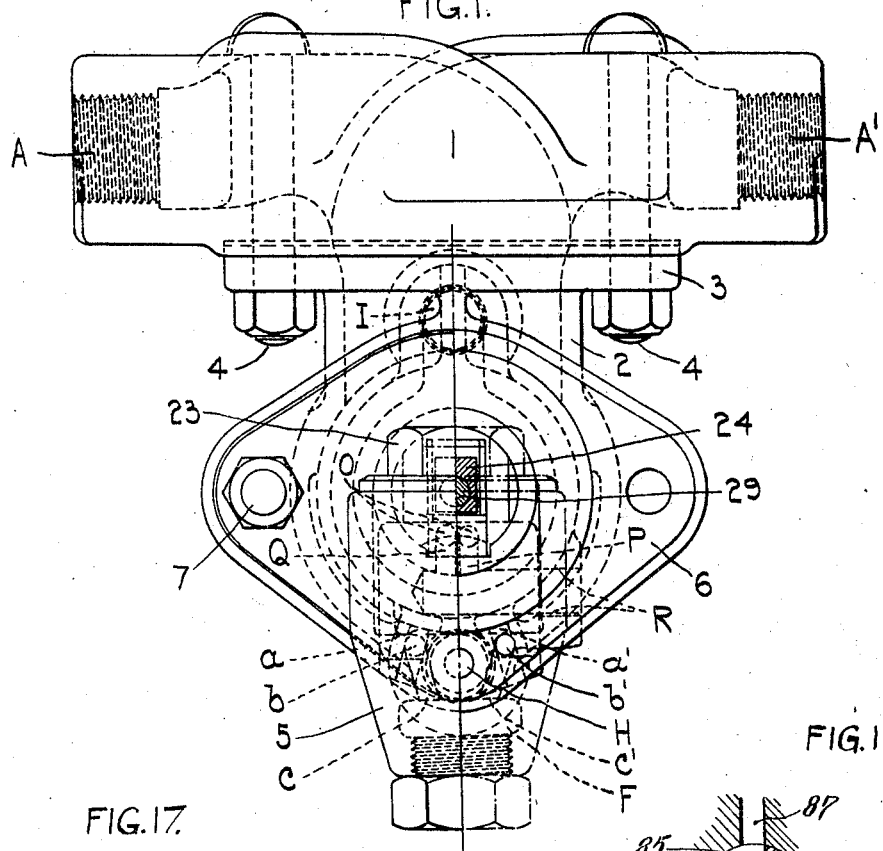
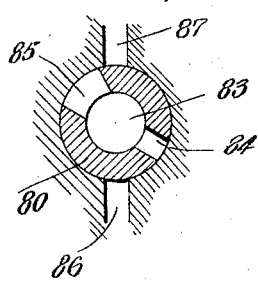
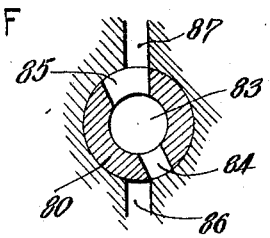

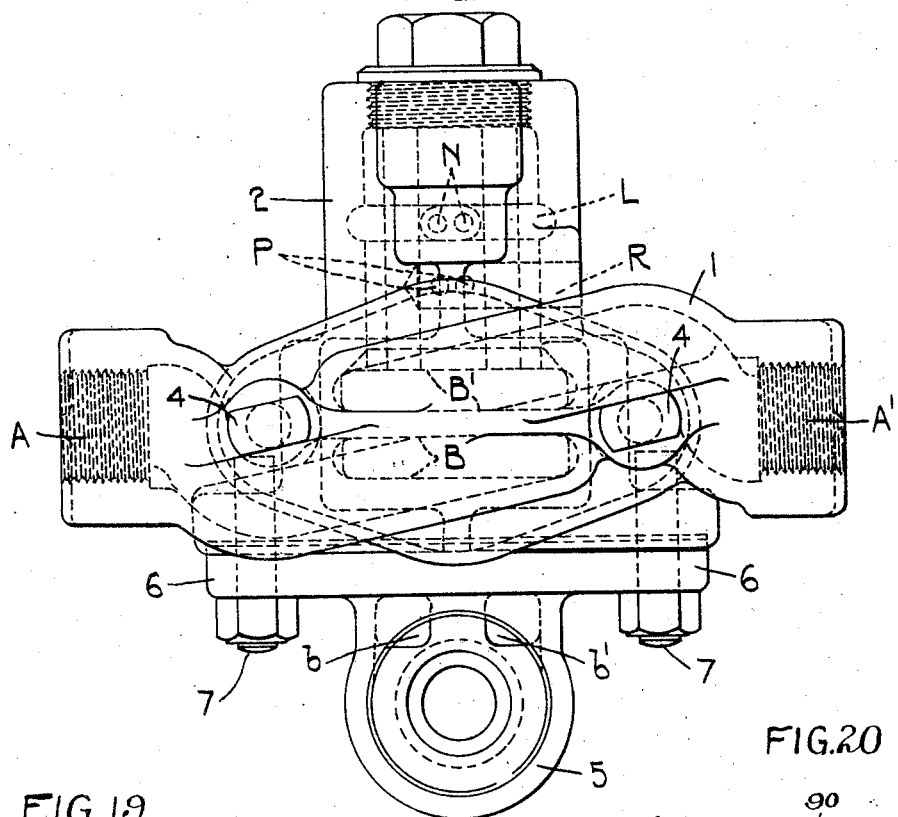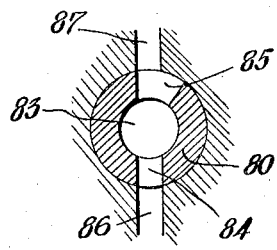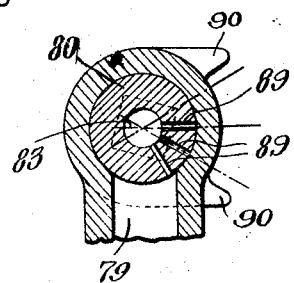

Aug. 31, 1926.

W. F. McDERMID 1,598,210

RAILWAY VEHICLE BRAKING SYSTEM

Filed Dec. 20, 1923     8 Sheets-Sheet 3

Aug. 31, 1926.  1,598,210
W. F. McDERMID
RAILWAY VEHICLE BRAKING SYSTEM
Filed Dec. 20, 1923   8 Sheets-Sheet 4
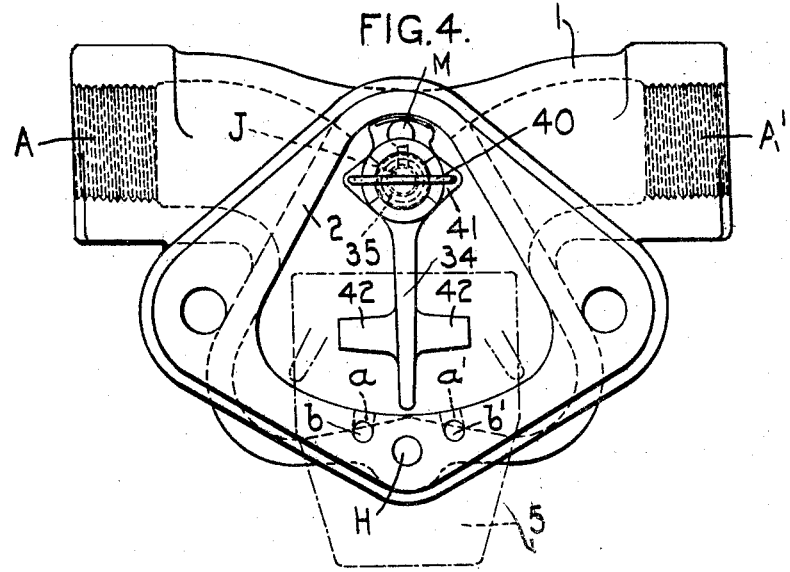
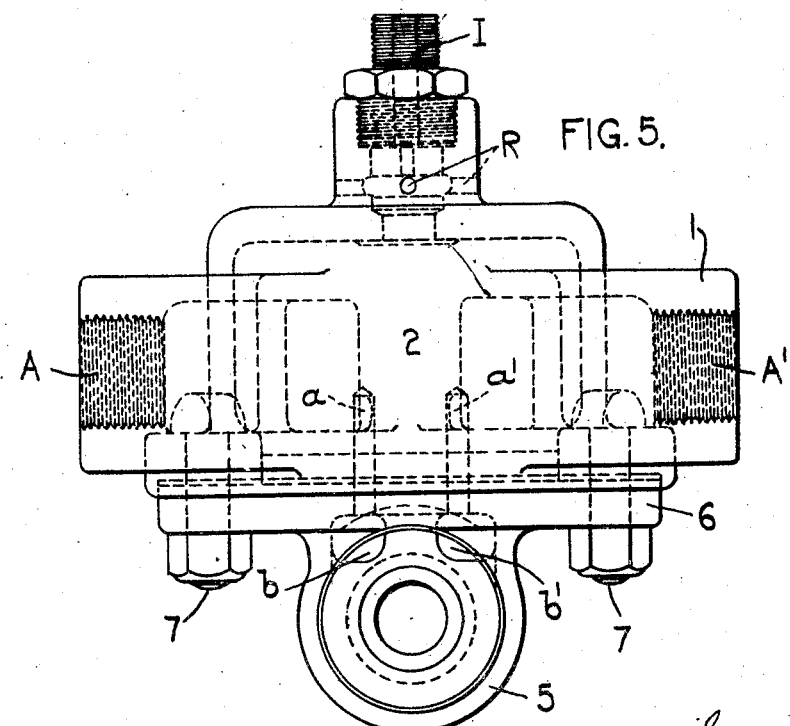

Aug. 31, 1926.

W. F. McDERMID 1,598,210

RAILWAY VEHICLE BRAKING SYSTEM

Filed Dec. 20, 1923   8 Sheets-Sheet 5

Aug. 31, 1926.
W. F. McDERMID
1,598,210
RAILWAY VEHICLE BRAKING SYSTEM
Filed Dec. 20, 1923     8 Sheets-Sheet 6
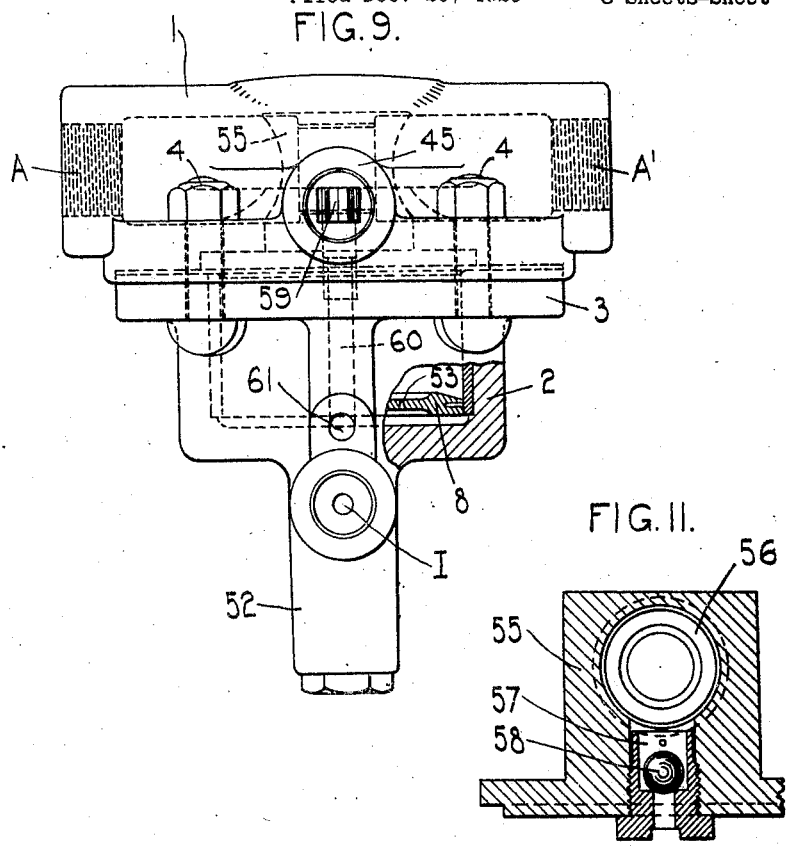
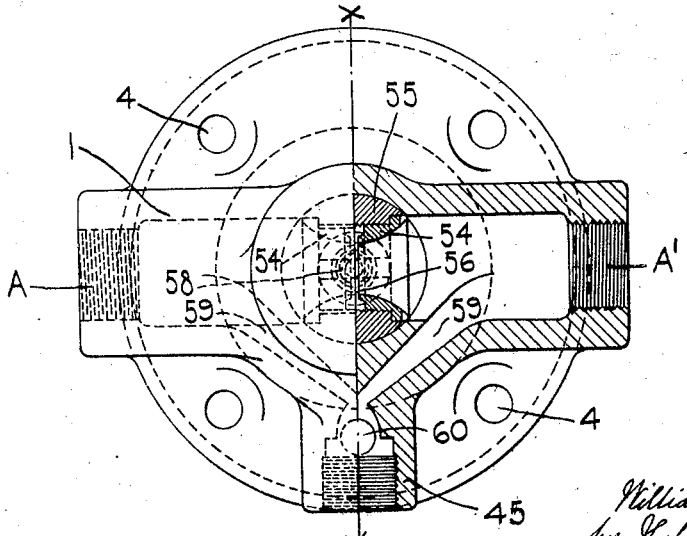

Aug. 31, 1926.
W. F. McDERMID
1,598,210
RAILWAY VEHICLE BRAKING SYSTEM
Filed Dec. 20, 1923      8 Sheets-Sheet 7
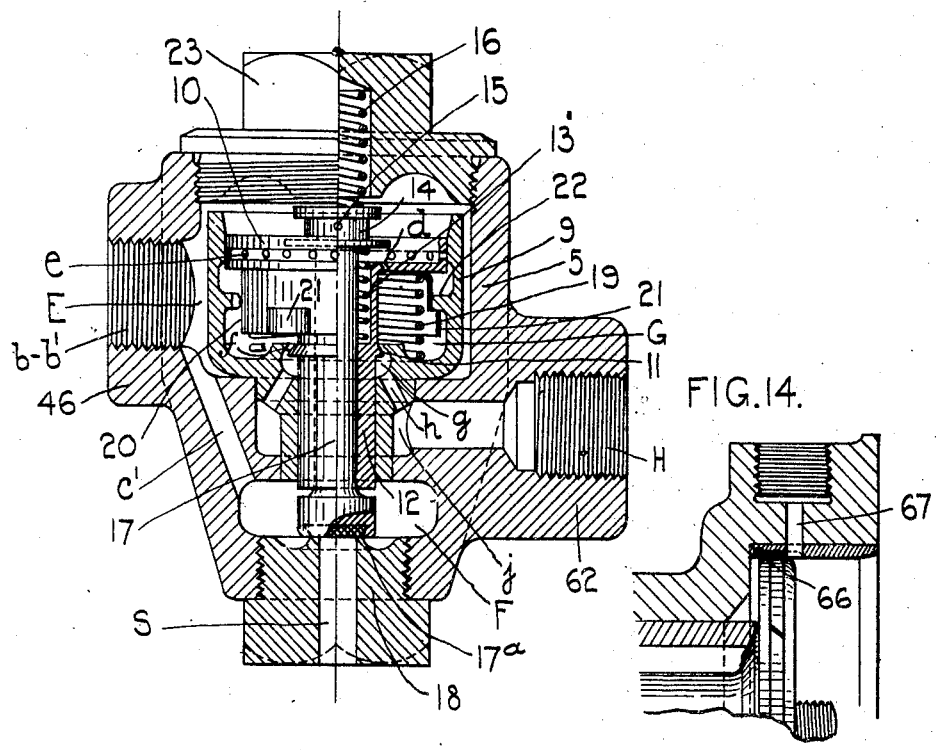
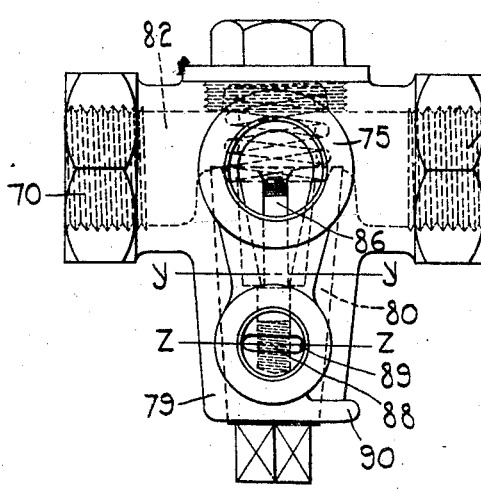
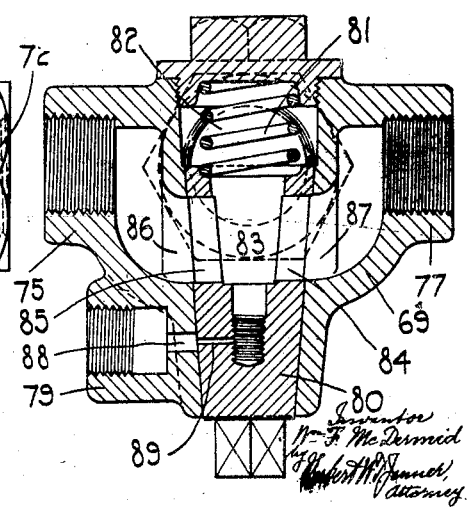

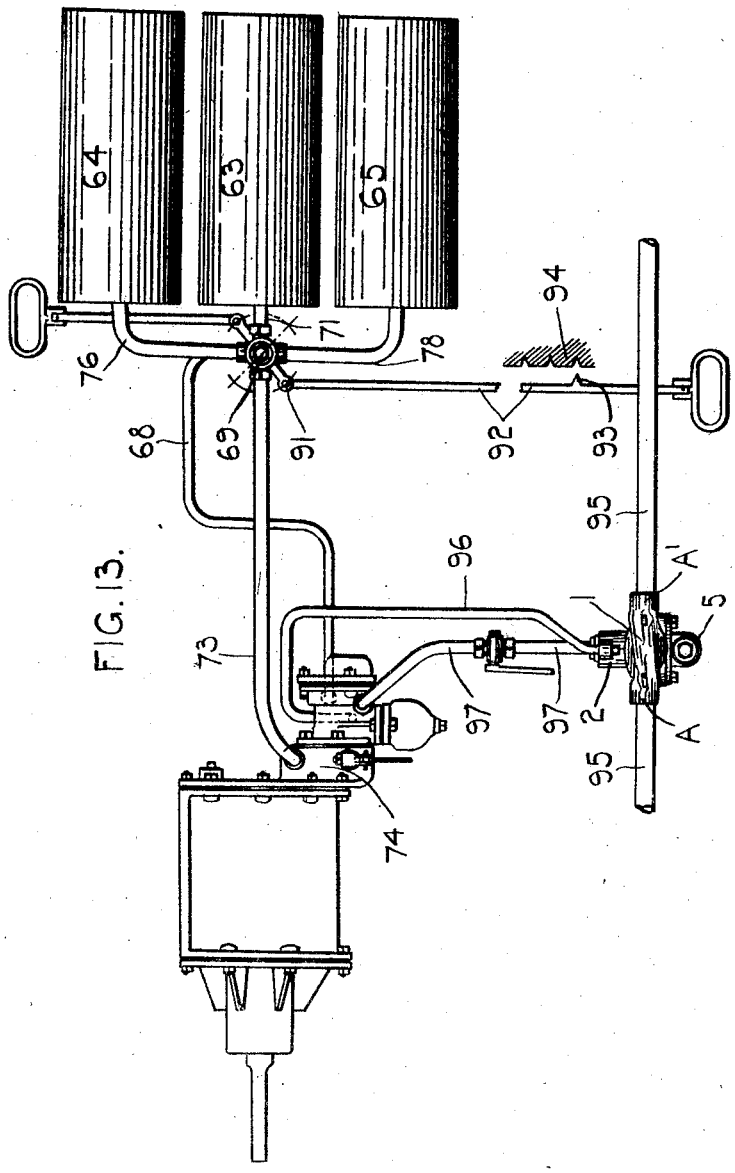

Patented Aug. 31, 1926.

1,598,210

UNITED STATES PATENT OFFICE.

WILLIAM FRANCIS McDERMID, OF SOUTH WOODFORD, ENGLAND.

RAILWAY VEHICLE BRAKING SYSTEM.

Application filed December 20, 1923, Serial No. 681,802, and in Great Britain December 20, 1922.

This invention relates to railway vehicle pressure braking systems in which the brakes on all the vehicles of a train are ordinarily applied or released from the engine foot plate.

The action of such brake systems as in use at present, is such that when a brake application or release is attempted, the brakes on the vehicles nearest the point of application or release are affected sooner than those further removed from the point of control, with the result that there is a variation of braking effort throughout the train which causes the rear portion to over-run or tend to over-run the remainder, and as a consequence there is considerable surging amongst the vehicles during the stopping of the train. A contributing cause of this rough working is also the lack satisfactory means for varying the brake-power on the individual vehicles so that it may be proportional to the load.

The present invention has for its object the provision of means in the said braking systems whereby the above mentioned disadvantages are avoided. More particularly, as applied to the "Westinghouse" brake, the objects of the invention are as follows:—

(a) To provide means whereby, when the brakes are being applied, the operation of the triple-valves ordinarily first effected by a reduction of pressure in the train-pipe is retarded, so that the brakes throughout a train can be brought into operation at approximately the same instant, or the brakes at the rear of a train may be applied even before those at the front end thereof.

(b) To provide means whereby the reduction of train-pipe pressure throughout the length of a train is accelerated by the air flowing from the triple-valves into the train-pipe acting on other valves which are provided, and causing them to open communication between the train-pipe and the brake cylinders or the atmosphere.

(c) To provide means for retarding the release of pressure from the brake cylinders so that the brakes throughout a train can be released at approximately the same instant.

(d) To provide means for readily varying the brake power on individual vehicles of a train so that this may be made somewhat proportional to the estimated load on the wheels.

In carrying the present invention into practice a suitably designed valve device is fitted on each vehicle between two lengths of the train-pipe, preferably at the place where a branch connection of said pipe communicates with the triple-valve; but in any case so that the air flowing through the train-pipe in either direction will pass through the valve. Part of this valve device serves as a branch connection between the train-pipe and the triple-valve, and within this part a piston or a piston valve is arranged. When air is flowing from the train-pipe toward the triple-valve the said piston or piston valve is moved by the air and opens a free passage so that the triple-valve may be forced to its brake release position in the usual way; but when the flow of air is in the opposite direction the piston or piston valve moves with it against the pressure of a control spring, and in so moving, restricts the opening or passage for air. The arrangement is such that, as the pressure of air on the piston or piston valve increases, the area of opening for the passage of air is reduced until, at a prescribed limit of flow, the said air opening is entirely closed, except for a leakage that is provided to ensure that the reduction of pressure on the underside of the triple-valve may continue slowly until it is reduced to the same level as that in the train-pipe.

Any reduction of train-pipe pressure beyond the limit above mentioned permits the pressure retained on the underside of the triple-valve to move the piston valve further and cause it to so act on a release valve as to open a way for air to pass from the train-pipe into the brake-cylinder or the atmosphere, as may be arranged for, and thus accelerate the reduction of train-pipe pressure throughout the train.

The release of pressure from the brake cylinder is retarded by means of another part of the valve device which is controlled by the movement of air within the train-pipe.

This functions by restricting or entirely closing the triple-valve exhaust opening, between the brake cylinder and the atmosphere, when the train-pipe pressure is increased. This part of the device may consist of pistons or vanes, placed within the train-pipe in such a manner as to be acted upon by the flow of air, and thereby moved in either direction from a normal central position, consequently operating the equivalent of a stop cock placed in a pipe connection or equivalent from the triple-valve exhaust port; or the flow of air within the train-pipe may operate an exhauster in connection with a chamber of suitable capacity formed on one side of a movable piston, the other side of which is acted upon by the full train-pipe pressure. The difference of pressure thus brought about on the two sides of the piston will be sufficient to move the piston from its normal release position and also an attached valve stem which closes the triple-valve exhaust port. The arrangement is such that the exhauster draws air from the one side of the piston, past a nonreturn valve, during the whole time that there is a sufficient flow of air in the train-pipe to operate the exhauster, and when the said flow of air becomes too slow to work the exhauster, equilibrium of pressure on the two sides of the piston will be slowly restored by air which flows from the train-pipe into the exhaust chamber through a small "timing" hole. The parts then return to the normal position and open the triple-valve exhaust passage so that the brakes release, owing to the pressure within the exhaust chamber acting on the one end area of the valve-stem, which at its other end is subject only to the pressure of the atmosphere. A soft-seat-valve formed on the valve stem prevents leakage from the train-pipe when the parts are in the normal brake release position.

It will be obvious that when an excess pressure is introduced into one end of the train-pipe, some movement of the air throughout the whole length of the pipe will occur almost instantaneously, the rate of such movement being greatest at the point of admission and slowest at the point most remote.

The velocity of the air at the ingoing end of the train-pipe being greatest, the exhausters at that end will be most effective while at the other end, where the velocity of the air will be slow, the effect of the flow on the exhausters will be very slight, thus the degree of rarefaction within the exhaust chambers will vary throughout the train, and be most pronounced at the front end, it follows that if the time required to restore equilibrium at the front end, exceeds the time necessary to recharge the train-pipe to a pressure sufficient to release the brakes at the rear end, the brakes at the rear end will release before those at the front end.

The connection between the train-pipe and the under side of the movable piston of the release retarded device embodying an exhauster is of peculiar construction. Twin-ports, one leading from either side of the exhauster device in the train-pipe, (which necessarily forms a slight obstruction to the flow of air within the train-pipe) are so arranged that the flow of air through the port in communication with that side of the exhauster having at any time a large excess of pressure, shall to some extent baffle the exit of air from its companion port in communication with the other side of the exhauster. The construction of the ports are such that at their train-pipe ends they possess a comparatively large area of opening and face the flow in opposite directions, one each way, something like "Pitot tubes", whereas at their other ends the ports terminate in narrow slots which meet at right angles to each other just where they enter an extension from the space below the movable piston, thus the inward flow through either port being the greater, it tends to obstruct the flow through its companion port. These ports serve to feed to and from the triple-valves, and to the accelerator valve, as well as before mentioned.

To vary the brake power on individual vehicles, in accordance with the estimated load thereof, a storage reservoir in the form of several small units is provided. These units may be put into or out of commission by means of a several-way cock or its equivalent, such that one or all of the several units provided may be connected with the triple-valve and with each other at will, preferably by means of a suitable handle associated with an indicator showing the degree of braking effort in terms of the load, which each position of the handle will provide.

The valve devices described may be made as one fitting, or each function may be fulfilled by a separate fitting with suitable pipe etc., connections, as required.

It will be understood that the precise constructions of valve devices embodying the invention may be varied as desired.

Fig. 1 of the accompanying drawings is a sectional end elevation, Fig. 2 a plan, and Fig. 3 a longitudinal section, illustrating one construction of a valve device embodying the invention.

Figs. 4, 5 and 6 are similar views to Figs. 1, 2 and 3, respectively, illustrating another construction of valve device embodying the invention.

Fig. 9 is a sectional elevation, Fig. 10 a sectional plan and Fig. 11 a vertical section to a larger scale corresponding to the line $x$, $x$ of Fig. 10 illustrating another construction of valve fitting for releasing embodying the invention.

Fig. 12 is a sectional elevation of a valve fitting employed in combination with either of the valve fittings shown in Figs. 7 and 8, and in Figs. 9, 10 and 11, for effecting the brake application.

Fig. 13 illustrates portions of a brake installation embodying the invention.

Fig. 14 is a sectional detail view of a portion of the triple-valve employed in the installation illustrated in Fig. 13, showing the feed port modification.

Fig. 15 is an elevation, Fig. 16 a central section, Figs. 17, 18 and 19 sections corresponding to the line $y$, $y$, of Fig. 15, and Fig. 20 a section corresponding to the line $z$, $z$ of Fig. 15, illustrating a multiple-way cock included in the brake system shown in Fig. 13.

Figure 3:
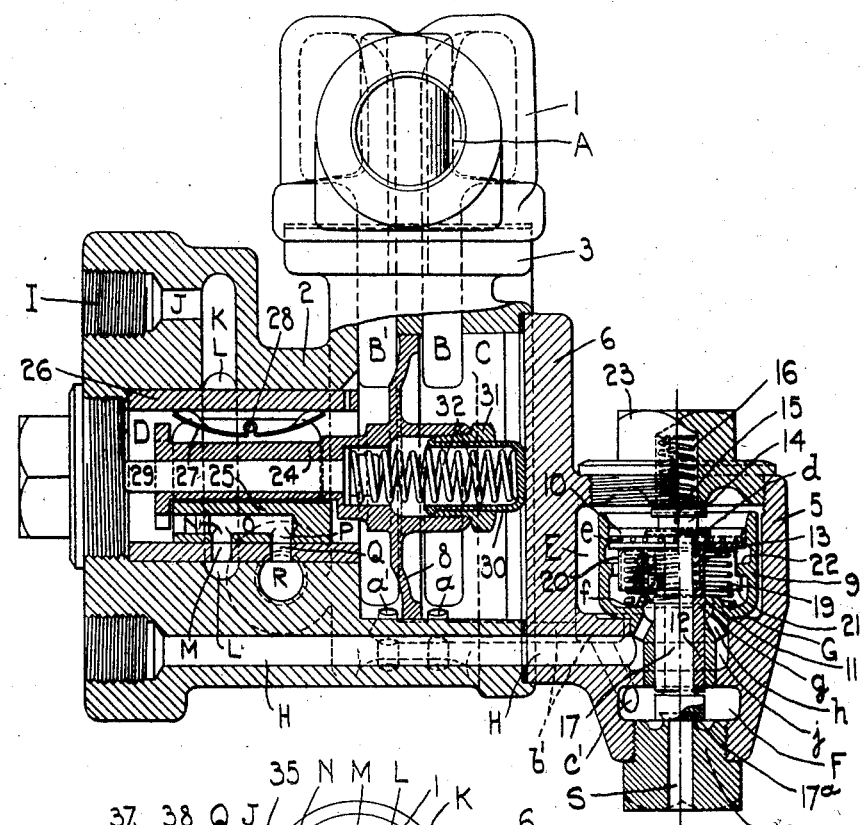

Referring to Figs. 1, 2 and 3, the valve device illustrated comprises three main parts, namely, a through connection 1 adapted to be included in and form part of the train-pipe, the ends A and A¹ being internally screwed branches to receive the train-pipe. A casing 2 that forms an extension of the part 1 and is secured thereto by a flange 3 and bolts 4. Another casing 5 that is fixed to one end of the casing 2 by a flange 6 and bolts 7.

The casing 2 constitutes a housing for valves which effect the object ($c$) before mentioned, namely retard the release of pressure from the brake cylinder so that the brakes throughout a train can be all released at approximately the same instant.

The casing 5 constitutes a housing for valves which effect the objects ($a$) and ($b$). before mentioned, namely retard the operation of the triple-valve when the brakes are being applied and which accelerate the reduction of train-pipe pressure throughout the length of a train, so that the brakes throughout a train can be brought into operation at the same time.

As the casings 2 and 5 are made separate from the through connection 1 to which they are connected the valves they contain can be removed readily as occasion requires for inspection or replacement.

The branches A, A¹ communicating with the train-pipe are in free communication with downwardly extending passages B, B¹ that open into the chamber C of the casing 2 at opposite sides of a piston 8 mounted to slide in the said chamber C. Ports or passages $a$ and $a^1$ serve to convey air to or from the chamber C, which in effect forms part of the train-pipe, from or into other chambers E and F in the casing 5, the connection being by way of ports $b$, $b^1$ and $c$, $c^1$ respectively.

Fixed within the casing 5 is a cylindrical bushing 9 within which there is mounted to slide a piston valve 10. Train-pipe air from the chamber E can pass over the rim of the bushing 9 and through either or both of the small ports $d$ or $e$, formed through the piston valve 10, into the chamber G below said valve. The chamber G communicates, through an opening $f$ with a smaller chamber $g$ from which train-pipe air can pass through small ports $h$ into a cavity $j$ in free communication with a passage H adapted to be connected to the normal train-pipe connection on the triple-valve. The area of the opening $f$ from the chamber G is varied by the movement therein of a coned portion 11 of the stem 12 of the piston valve 10.

The normal exhaust opening of the Westinghouse triple-valve is in direct communication with the atmosphere; but, with apparatus according to this invention, it will be connected by suitable pipes with a threaded opening I formed therefor in the casing 2. The arrangement is such that, when the valve parts within the casing 2 are in the positions shown, any air passing from the triple-valve exhaust port can travel through ports or passages J, K, L, M, N, O, P, Q and finally through a port or passage R to the atmosphere.

All parts are shown in the "running" position, and there is through-connection in the train-pipe, by way of ports A and A¹, on each vehicle, also each triple-valve is in communication with the train-pipe as hereinbefore described, therefore the apparatus may be considered as charged with high-pressure air as is usual. That is to say, all the parts are charged to an equal pressure, not only so far as concerns apparatus embodying the invention; but the usual Westinghouse reservoirs, and the chambers on the train-pipe side of each triple-valve are also charged. Assuming that, under these conditions, the brakes are to be applied in the usual way by a reduction of train-pipe pressure at, for instance, that end of the train-pipe which is connected to the branch A of the valve device. If the reduction of pressure in the train-pipe is effected very slowly indeed, the brakes may go "on," perhaps without even moving the internal parts of the valve device; but, should the reduction be made at the normal rate, the air flowing from each triple-valve cavity into the train-pipe, will act on the piston valve 10 and move it and its attached parts, against the pressure of a control spring 13, and, in so doing, the flow of the air will be checked by the consequent restriction of the opening $f$ as the coned portion 11 of the piston-valve stem 12 is moved towards it.

Under these conditions it follows that the area of opening through which the air can flow from any triple-valve into the train-pipe varies inversely as the difference of pressure which induces it to flow. The difference of pressure varies throughout the length of the train and is greatest at the point where the initial reduction of train-pipe pressure is being made, therefore, in a brake system embodying the invention, while a brake application is being made the operation of the triple-valves which are ordinarily first effected by a reduction of pressure in the train-pipe is retarded to a greater extent than that of the triple-valves at more remote parts of the train, so that (because the rate of flow multiplied by the area of opening equals a practical constant), the brakes throughout the train are brought into operation at approximately the same instant, or alternatively, if the controls have been adjusted for that purpose, the brakes at the rear of the train may be applied even before those at the front end thereof.

When it is desired that the brakes shall become operative with a minimum delay, the reduction of train-pipe pressure will be more intense than usual. Apparatus embodying this invention is so constructed that, under such conditions, because of the greater initial reduction of train-pipe pressure, the air endeavouring to flow from the triple-valve cavity into the train-pipe will act on the piston valve 10 with increased pressure, and thus move it further than under the conditions first described. This further movement brings the piston valve 10 hard up against the under side of a nut 14 which is screwed on the valve stem 17 and secured thereto by a pin 15. The under side of the nut 14 acts as a valve and serves to partly close the small ports $d$ through which air is passing into the train-pipe. The effect of this movement is an increase of pressure acting on the piston valve so that the valve stem 17 is lifted by it against the pressure of a spring 16, thus opening a soft-seated valve $17^a$ and allowing air to escape from the train-pipe direct to the atmosphere, or into the brake cylinder through a passage S in the valve seating 18.

This accelerates the reduction of train-pipe pressure throughout the train, with the well-known result, namely that the rate of flow of air from the triple-valve into the train-pipe is increased and the brakes are thus brought into action sooner than usual.

The piston valve 10 is poised in its mid, or "running" position, by a spring 19 which is trapped between the bottom of the bushing 9 and a spring retainer 20 when the latter is in the position shown.

From this mid position the piston valve 10 may move either upwards against the pressure of the spring 13 as before described or downwards against the pressure of the spring 19 when air is flowing from the train-pipe toward the triple-valve for the purpose of releasing the brakes, thereby opening a free passage for the air through the either or both of the small ports $d$ or $e$, through the chamber G, opening $f$, smaller chamber $g$ and so on to the triple-valve.

The spring 19 and retainer 20 are placed, and may be secured, in position as follows— the retainer, which has three lugs 21 formed on its periphery, is placed over the spring 19 and pressed downwards, the lugs thereupon passing through suitable gaps formed for the purpose in a retaining ring 22. The retainer 20 is then turned about its vertical axis, say 60° or thereabout and released. The lugs 21 then register against the under side of the retaining ring 22 and are held in that position by the spring 19. For the purpose of securing the parts in their axial working position, the ends of the spring 19 can be bent and caused to engage in suitable holes or recesses formed in the retainer 20 and the bushing 9, thus the spring will serve to keep the parts in alignment.

A cap 23 serves as the housing for the spring 16 and also as a stop for the valve stem 17 by contact with the upper face of the nut 14. When unscrewed it provides for the ready removal of the piston valve and other parts for the purposes of inspection, cleaning or otherwise.

Providing for a local release of air from the train-pipe, for the purpose of accelerating an application of the brakes, is a well-known feature of the Westinghouse brake, and in that case, the release is effected by the movement of the triple-valve slide-valve itself; but with apparatus according to the present invention, it is the first movement of the air toward the train-pipe which brings about the required local further reduction of pressure in that train-pipe, before the triple-valve has even moved.

In apparatus embodying the present invention the release of pressure from the brake cylinders is controlled by the air within the train-pipe, so that the brakes throughout a train can be released at approximately the same instant.

The movable piston 8 is placed within the train-pipe in such a manner that any appreciable movement of the air within the train-pipe moves the piston, either one way or the other, from its normal mid or "running" position, thereby closing the usual triple-valve exhaust passage between the brake-cylinder and the atmosphere.

Referring to Fig. 3, the piston 8 is formed in one piece with a stem 24 which engages with a slide-valve 25 which closes the exhaust port Q when moved in either direction. This slide-valve 25 works within the bore D of a bush 26 which has formed within it the usual working face pierced by the two ports, namely port M in connection with the brake cylinder, and port Q leading to the atmosphere. The face of the valve is kept up to this working face by a spring 27 attached to the valve by a pin 28 in such a manner that, while moving with the valve, it can press against and slide along the wall of the bush.

The stem 24 is bored along its axis to accommodate a cylindrical locating piece 29 along which the stem can be moved in one direction; but, if moved in the other direction, carries the locating piece 29 with it. At the other end of the stem 24 another locating piece 30 is provided. This moves within a bush 31 which is screwed into the stem in a manner which provides the necessary freedom of movement for the locating piece 30 in one direction, while fixing its position with relation to the valve 25 in the other direction.

Between these two locating pieces 29 and 30, which at their outer ends register against the walls of the casing, a spring 32 is fitted, the arrangement being such that, in moving the stem 24 in either direction the spring 32 is compressed between the locating pieces; and, when the force which moved the stem is dissipated, the spring reacts and moves the parts back to their normal mid position.

It will be obvious that the piston 8 will be moved by the flow of air in the train-pipe when the brakes are being applied, this however, does not matter, and in no way interferes with the putting on of the brakes.

When however, the brakes are being released, and an excess pressure is introduced into one end of the train-pipe, some movement of air throughout the whole length of the pipe will occur almost instantaneously, the rate of such movement being greatest at the point of admission and slowest at the point most remote.

The velocity and therefore the difference of pressure of air at the ingoing end of the train-pipe being greatest, throughout the release period, it follows that the influence of the flow of air in the train-pipe will lessen off to practically nothing at the opposite end, consequently it will be possible to release the brakes at the rear end of a train before they are allowed to release at the front end.

Figure 6:
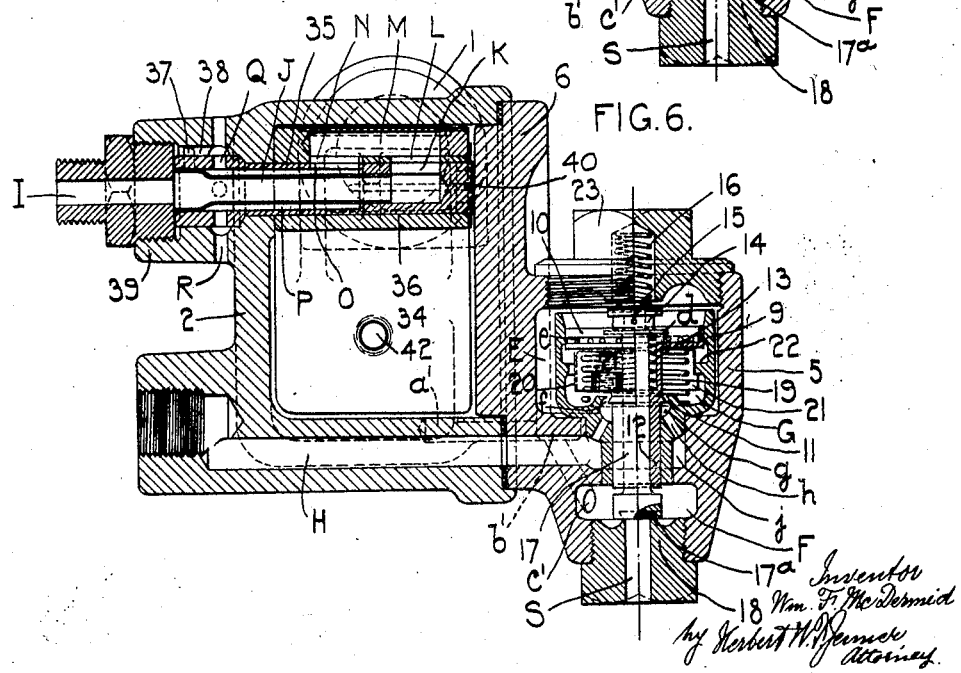

In the construction of valve device shown in Figs. 4, 5 and 6, a casing 2 equivalent to the casing 2 of the device shown in Figs. 1, 2 and 3, is formed in one with the through-connection 1, and fixed to the said casing 2 is the casing 5 containing the valve devices already described which retard the operation of the triple-valve when the brakes are being applied and which accelerate the reduction of train-pipe pressure throughout the length of a train so that the brakes throughout a train can be brought into operation at the same time.

For the purpose of retarding the release of pressure from the brake cylinder so that the brakes throughout a train can be all released at approximately the same instant, the casing 2, which is in free communication with the train-pipe, contains a pivoted vane 34. The branch I is connected to the exhaust opening of the Westinghouse triple-valve and in the normal "running" position shown, this branch is in free communication with the atmosphere through a pipe conduit J, a port K in a hollow trunnion pin 35 on which the vane 34 is mounted to rock, ports and passages L, M, N in the hollow boss 36 of the vane, another port O in the hollow trunnion pin, the annular space P between the wall of the hollow trunnion pin 35 and the exterior of the pipe conduit J, and ports Q and R. The hollow trunnion pin 35 is prevented from rocking by a pin 37 engaging a groove 38 in the boss 39 into which is screwed a nipple constituting the branch I. 40 indicates a length of steel wire bent into U-shape the cross member thereof engaging a recess formed therefor in the end of the fixed trunnion pin 35 and the free ends thereof engaging holes in lugs 41 laterally projecting from the boss 36 of the pivoted vane. This piece of bent steel acts as a spring to resist with slight but sufficient pressure movement of the vane 34 from the mid position shown. 42 are projections on the vane adapted to limit the angular movement of the vane by contacting with the walls of the casing.

The ports leading to and from the valve casing 5 are indicated by corresponding reference letters to the similar ports in the construction shown in Figs. 1, 2 and 3 and as the operation of the valve devices in the casing 5 is identical with that already described there is no need to again describe the same.

Any appreciable movement of air within the train-pipe moves the vane 34 one way or the other from the normal or "running" position shown, thereby closing the port K, that is to say closing the usual triple-valve exhaust passage between the brake cylinder and the atmosphere and, as before described, retarding the release of pressure from the brake cylinders so that the brakes throughout a train can be released at approximately the same instant.

Figure 7:
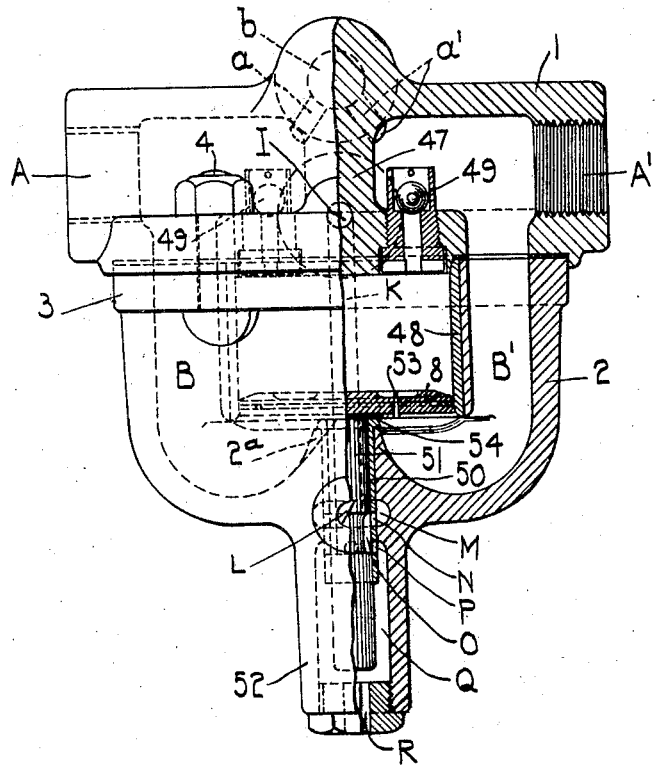
Fig. 7 is a sectional elevation, and Fig. 8 a plan with part broken away, illustrating an alternative construction of valve fitting for releasing according to the invention.
Figure 8:
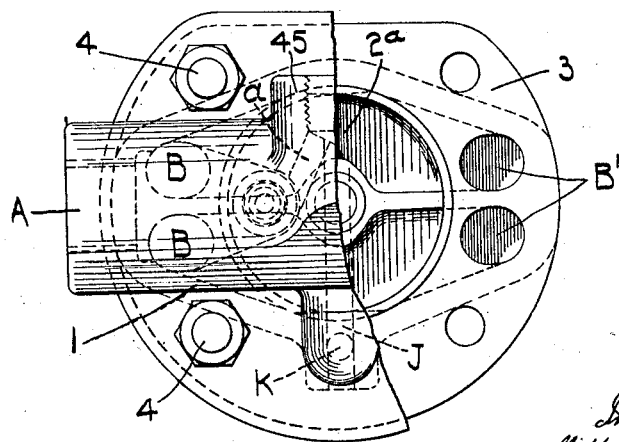

The valve device shown in Figs. 7 and 8 comprises a through-connection 1 having branches A and A¹ for connection to the train-pipe, and a casing 2 secured thereto by a flange 3 and bolts 4. This valve fitting is designed for use with valve devices as already described as arranged in the casing 5, the said casing 5 being in this case constructed as a separate fitting, see Fig. 12.

45 indicates a branch adapted to be connected to a branch 46 of the fitting shown in Fig. 12, air from the train-pipe passing freely through ports a and a¹ into the pipe (which is the equivalent of the passages $b$ and $b^1$ in the valve devices already described) connecting the said branches 45 and 46.

A web 47 forms a partition wall in the through-connection 1 between the ports $a$ and $a^1$. Air from the train-pipe can freely pass from the branches A, $A^1$ of the through-connection 1 through passages B, $B^1$, to the under side of a piston 8 arranged to slide in a cylinder 48 centrally arranged within the casing 2. The upper end of the said cylinder is furnished with non-return ball valve fittings 49 that allow air from above the piston 8 to pass freely into the train-pipe. 53 indicates a leak port or timing hole in the piston 8 through which the train-pipe pressure is slowly restored in the chamber above the piston 8.

Another branch of the through-connection 1, located below the branch 45 thereof, is formed with a passage I connected to the triple-valve exhaust, and the said passage I is placed in communication with the atmosphere through a passage J that forms a continuation of the branch passage I, a down passage K, a passage L below the passage J, an annular chamber M, ports N in a sleeve 50 fixed in the lower part of the casing 2, an annular groove O formed in a stem 51 of the piston 8, other ports P formed in the sleeve 50, a passage Q in a downwardly extending elongated boss 52 of the casing 2, and an exit port R.

As in the valve arrangement already described with reference to Figs. 1, 2 and 3, any appreciable movement of air in the train-pipe moves the piston 8 with its stem 51 thereby more or less or entirely closing the exhaust ports P in the sleeve 50, so that the release of pressure from the brake cylinders is retarded in order to ensure the release of all the brakes throughout a train at approximately the same instant. 54 indicates a soft-seat-valve formed at the junction of the valve stem 51 with the piston 8, that seats on the suitable formed top of the sleeve 50, when the piston 8 is in its lowest position, and prevents leakage of air from the train-pipe when the parts are in the normal "running" position shown. When the piston 8 is in its lowest position as shown its under side is adjacent to the knife edge formation $2^a$ of the lower part of the casing 2, so that communication between the branches A and $A^1$ is restricted until upward movement of the piston takes place.

The valve device shown in Figs. 9, 10 and 11 is similar in construction to that shown in Figs. 7 and 8, in that the through-connection 1 has fixed to it a casing 2 containing a piston 8 furnished with a valve stem controlling an exhaust port. In this construction however there is a through-passage in the connection 1 that places the branches A and $A^1$ in direct connection with each other. Midway of the length of this passage is an exhauster operated by the flow of air within the trainpipe. The said exhauster is constituted by two sleeves 54 screwed from opposite ends into a boss 55 of a flange like member forming the top of the piston chamber of the casing 2, the said boss projecting into the through-connection 1. The sleeves 54 are arranged in axial alignment with each other and with the branches A, $A^1$ and each sleeve is formed with an outwardly flared or tapering bore as shown. Between the adjacent ends of the two sleeves, which necessarily form a slight obstruction to the flow of air within the trainpipe, a space 56 is left which communicates, through a passage 57, with the space above the piston 8, a non-return ball valve 58 being fitted in the said passage 57. Air from the train-pipe passes to the under side of the piston 8 through twin ports 59, leading one from each side of the exhauster 54, and passages 60 and 61. The ports 59 also communicate with a branch 45 which, when the device is installed in a brake system, is connected to the branch 46 of the accelerator valve casing 5, see Fig. 12.

In the valve device shown in Figs. 9, 10 and 11, the port I that is connected to the triple-valve exhaust, communicates directly with the annular chamber M and thence with the atmosphere through ports N, passage O, ports P, passage Q and port R, see Fig. 7.

It will be seen that with the valve device shown in Figs. 9, 10 and 11, movement of air within the train-pipe will cause the exhauster 54 to draw air from above the piston 8 past the non-return valve 58, so long as there is a sufficient flow of air in the train-pipe and as the velocity of air at the ingoing end of the train-pipe is necessarily greatest, the exhausters at that end will be more effective than those at the other end of the train-pipe, thus the degree of rarefaction in the chambers above the pistons 8 will vary throughout the train and when the exhauster has ceased to function equilibrium of pressure will be slowly restored through the timing hole 53. The ports 59, see Fig. 10, are larger at their train-pipe ends than at their other ends, after the manner of "Pitot tubes." The smaller ends of the ports 59 are formed as narrow slots meeting at right angles to each other so that greater inward flow of air through either port tends to obstruct the flow of air through the other port, and consequently increasing to that extent the quantity of air which must pass through the exhauster.

Fig. 12 illustrates an accelerator valve device suitable for use in association with the valve devices shown in Figs. 7 and 8 and in Figs. 9, 10 and 11. This valve device contains the parts previously described as contained in the casing 5 and as these parts are indicated with corresponding reference letters and figures further description is unnecessary. The port equivalent to the ports $b$ and $b^1$ of the casing 5 is in a branch 46 and the port H is in a branch 62 adapted to be connected to the normal train-pipe connection on the triple-valve.

In order to vary the brake power on individual vehicles of a train in accordance with the estimated load thereof, the storage reservoir in a brake system embodying this invention consists of several units adapted to be put into and out of commission as desired. Fig. 13 shows three such units, 63, 64 and 65.

In the ordinary Westinghouse triple valve compressed air passes into the reservoir through a leakage groove the area of opening of which is arranged to suit the capacity of the reservoir; this groove is indicated in solid black at 66 in Fig. 14. With an arrangement embodying the present invention this groove is not necessary, the triple-valve casing being formed with a simple port 67, Fig. 14, connected by a pipe 68, Fig. 13, to a multiple-way cock 69 a part of which fulfills the same function as the leakage groove, namely effects the variation of feed according to the capacity of the reservoir.

Figs. 15 to 20 inclusive illustrate the construction of the cock 69. The cock casing is provided with a branch 70 connected by a pipe 71 to the reservoir unit 63, a branch 72 connected by pipe 73 to the triple-valve casing 74, a branch 75 connected by a pipe 76 to the reservoir unit 64, a branch 77 connected by a pipe 78 to the reservoir unit 65 and a branch 79 connected to the feed pipe 68. The branches 70, 72, 75 and 77 are arranged in the one plane and the branch 79 is arranged in another plane. Mounted to rotate in the cock casing is a ported conical plug 80 that is maintained by a spring 81 against its conical seating in the casing. The branches 70 and 72 are in free communication with each other through a passage 82 in the casing above the plug 80 and in which passage the spring 81 is located, so that the reservoir unit 63 is always in free communication with the triple-valve casing. The plug 80 is formed with a central chamber 83, closed at one end but open at its other end to the passage 82 and thence to the unit reservoir 63 and the triple-valve casing. Ports 84 and 85 formed in the plug wall are arranged, as the plug rotates, to align with ports 86 and 87 formed in an inner wall of the casing. The port 86 communicates with the branch 75 connected to the reservoir unit 64 and the port 87 communicates with the branch 77 connected to the reservoir unit 65. With the plug in the angular position shown in Fig. 17 the ports 86 and 87 are closed so that only the reservoir unit 63 is in commission. When the plug is moved into the position shown in Fig. 18 the port 85 registers with the port 87 and the reservoir unit 65 is brought into commission also, whilst when the plug is moved into the position shown in Fig. 19 the port 84 registers with the port 86, the port 85 which is wider than the port 86 still registering with the port 87, so that all three reservoir units 63, 64 and 65 are in commission. The feed branch 79 communicates with the chamber 83 of the plug through a long port 88 in the casing and three small ports 89 formed through the plug wall. In the positions shown in Fig. 17 in which one reservoir only is in commission one only of these small ports 89 is opposite the port 88 and consequently in communication with the triple-valve feed pipe 68, see Fig. 20. In the position shown in Fig. 18 in which two reservoir units are in commission, two of the small ports 89 are opposite the port 88 whilst in the position shown in Fig. 19 in which all three of the reservoir units are in commission, all three of the small ports 89 are opposite the port 88, so that the feed is varied according to the reservoir capacity. 90 indicates lugs on the cock casing that form stops to limit the extreme positions of the operating lever 91, see Fig. 13.

The operating lever 91 may conveniently be actuated by a long handle 92 having a pointer 93 arranged to move over a notched plate 94 that may show the degree of braking effort in terms of the load corresponding to each of the three positions of the handle, the said plate having three notches adapted to be engaged by the pointer 93.

Referring to Fig. 13, 95 indicates the train-pipe in which is included a composite valve fitting constructed as shown in Figs. 1, 2 and 3, 96 indicates the pipe connection to the normal exhaust opening of the Westinghouse triple-valve 74, and 97 the pipe connecting the valve fitting to the normal train-pipe connection of the triple-valve.

As before stated the details of construction of the several valve devices hereinbefore described may be varied without departure from the invention.

What I claim is:—

1. In a brake system, a train pipe, a triple-valve, and a valve operatively connected with the said parts and controlled by the pressure of air in the train pipe, said valve being provided with means for closing it automatically, when the pressure in the train pipe is decreased to apply the brake, in inverse proportion to the differences in pressure which induce the flow.

2. In a brake system, a train pipe, triple-valves, and valves included in the train pipe, each valve being operatively connected with the triple-valve to which it pertains, and each said valve being provided with means for closing it automatically to a predetermined extent when the pressure in the train pipe is decreased to apply the brakes.

3. In a brake system, a train pipe, triple-valves, and valves included in the train pipe, each valve being operatively connected with the triple-valve to which it pertains, and each said valve being provided with means for closing it automatically, when the pressure at one end of the train pipe is decreased to apply the brakes, in proportion to the decrease in pressure and its distance from the said end of the train pipe, the operating of the triple-valves ordinarily first effected being retarded.

4. In a brake system, the combination, with the parts set forth in claim 1, of a pressure relief valve operatively connected with the aforesaid valve and opened by it, to accelerate the action of the triple-valve and brake pertaining to it, when the pressure in the train pipe is decreased suddenly.

5. In a brake system, the combination, with the parts set forth in claim 2, of a plurality of storage reservoirs for compressed air provided with means for connecting them separately or simultaneously at will with each triple-valve to vary the brake action on different cars.

6. In a brake system, the combination, with the parts set forth in claim 1, of an exhaust control valve communicating with the exhaust opening of the triple-valve and operatively connected with the aforesaid valve, said exhaust control valve operating to retard the outflow of the exhaust to a predetermined extent when the pressure in the train pipe is increased to release the brake.

7. In a brake system, a valve device comprising three detachable casings, the first casing being provided with passages for communicating with a train pipe, the second casing being secured to the first casing and provided with a piston and a cylinder having its ends communicating with the respective passages of the first casing, said second casing having also air passages at its respective ends, and the third casing being secured to the second casing and provided with air passages communicating with the said air passages respectively, and an automatic valve inclosed in the third casing and operating to control the passage of air through its said passages.

8. In a brake system, a valve casing provided with chambers for connection with a train pipe and with a triple-valve respectively, a valve cylinder secured in the said casing and having a connecting passage between the said chambers, a piston slidable in the said cylinder and provided with an air passage and having a valve which partially closes the said connecting passage when the pressure in the train pipe chamber is reduced and the piston slides in one direction.

9. In a brake system, a valve casing provided with chambers for connection with a train pipe and with a triple-valve respectively, a valve cylinder secured in the said casing and having a connecting passage between the said chambers, a piston slidable in the said cylinder and provided with separate air passages, said piston having also a valve for partially closing the said connecting passage, and having also a tubular guide, a valve stem slidable in the tubular guide and having a pressure relief valve for the train pipe chamber at one end and having at the other end a disk valve which closes one of the separate air passages in the piston when the piston is slid against it, upon a reduction of pressure in the train pipe chamber, and thereby constrains the piston to open the said relief valve.

10. In a brake system, a valve casing provided with chambers for connection with a train pipe and with a triple-valve respectively, a valve cylinder secured in the casing and having one end connected with the train pipe chamber, the other end of the valve cylinder being provided with a passage connecting it with the triple-valve chamber, a piston slidable in the valve cylinder and having holes which connect the ends of the cylinder, said piston having also a valve for partially closing the said passage, and having also a tubular guide, a valve stem slidable in the said guide and having a pressure relief valve for the train pipe chamber at one end and having at the other end a disk valve arranged to overlap certain of the holes in the piston, said relief valve being opened by the piston after it has slid into engagement with the said disk valve.

11. In a brake system, a valve device as set forth in claim 10, and having also a spring arranged in one end of the valve cylinder and operating to slide the piston in one direction.

12. In a brake system, a valve device as set forth in claim 10, and having also a spring arranged in one end of the valve cylinder and operating to slide the piston in one direction, said valve device having also two springs arranged one on each side of the said disk valve, one of the said springs operating to slide the piston in the reverse direction and the other spring operating to close the said relief valve.

13. In a brake system, a valve casing provided with a cylinder having two air passages at each end, which operate to connect each end of the cylinder with a train pipe and with a triple-valve, one end of the cylinder being also provided with a passage for connecting it with the exhaust opening of the said triple-valve and having also an exhaust port and a port for connection with the brake cylinder, a piston slidable in the said cylinder, and a slide valve operated by the said piston and controlling the passage of air through the said ports.

14. In a brake system, a valve device as set forth in claim 13, the said piston being provided with a tubular stem, slidable positioning pieces arranged in the end portions of the tubular stem, and a spring interposed between the said positioning pieces.

In testimony whereof I affix my signature.

WILLIAM FRANCIS McDERMID.